(12) United States Patent
Kunimochi

(10) Patent No.: US 9,465,155 B2
(45) Date of Patent: *Oct. 11, 2016

(54) SPREAD ILLUMINATING APPARATUS

(71) Applicant: MINEBEA CO., LTD., Kitasaku-gun, Nagano (JP)

(72) Inventor: Toru Kunimochi, Fukuroi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,908

(22) Filed: Dec. 8, 2014

(65) Prior Publication Data

US 2015/0092445 A1 Apr. 2, 2015

Related U.S. Application Data

(63) Continuation of application No. 13/716,846, filed on Dec. 17, 2012, now Pat. No. 8,931,943.

(30) Foreign Application Priority Data

Dec. 22, 2011 (JP) .................................. 2011-281362
Dec. 22, 2011 (JP) .................................. 2011-281391

(51) Int. Cl.
G02B 6/42 (2006.01)
F21V 8/00 (2006.01)

(52) U.S. Cl.
CPC ............ *G02B 6/0011* (2013.01); *G02B 6/0018* (2013.01); *G02B 6/0021* (2013.01); *G02B 6/0031* (2013.01); *G02B 6/0083* (2013.01)

(58) Field of Classification Search
CPC .. G02B 6/0011; G02B 6/0018; G02B 6/002; G02B 6/0021; G02B 6/0031; G02B 6/0068; G02B 6/0083; G02B 6/0091
See application file for complete search history.

(56) References Cited

U.S. PATENT DOCUMENTS

| | | | |
|---|---|---|---|
| 6,935,764 | B2 | 8/2005 | Choi et al. |
| 7,056,001 | B2 | 6/2006 | Chuang |
| 7,182,499 | B2 | 2/2007 | Chen et al. |
| 8,118,465 | B2 | 2/2012 | Kunimochi et al. |
| 8,743,314 | B2 | 6/2014 | Son |
| 8,814,412 | B2 | 8/2014 | Yabe et al. |
| 2008/0043171 | A1 | 2/2008 | Takahashi et al. |
| 2012/0002441 | A1 | 1/2012 | Yabe et al. |

FOREIGN PATENT DOCUMENTS

| | | |
|---|---|---|
| JP | 2010-040434 A | 2/2010 |
| JP | 2011-096523 A | 5/2011 |
| JP | A-2011-96523 | 5/2011 |

*Primary Examiner* — Alan Cariaso
(74) *Attorney, Agent, or Firm* — Oliff PLC

(57) ABSTRACT

A spread illuminating apparatus includes a point light source with a light-emitting surface, a circuit board with a mounting surface on which the point light source is mounted, and a light guide plate with an incident light surface and an emitting surface. The circuit board is arranged as that at least a partial portion of the circuit board extends beyond an area where the point light source is mounted so as to be superposed on the light guide plate, a light-reflecting member is arranged on the mounting surface, and a region of the mounting surface in which the light-reflecting member is arranged includes a first region that extends forward from a position corresponding to the center of the light-emitting surface of the point light source.

2 Claims, 4 Drawing Sheets

SPREAD ILLUMINATING APPARATUS

CROSS-REFERENCE TO RELATED APPLICATIONS

This is a Continuation Application of application Ser. No. 13/716,846, filed on Dec. 17, 2012, which claims priority to Japanese Applications JP 2011-281362 and JP 2011-281391, both filed on Dec. 22, 2011. The entire disclosures of the prior applications are hereby incorporated by reference herein in their entirety.

BACKGROUND OF THE INVENTION

1. Field of the Invention

The present invention relates to a sidelight-type spread illuminating apparatus including a light guide plate in which light sources are arranged at an incident light end surface for emitting widely spread light from emitting portions.

2. Description of the Related Art

As an illumination unit in a liquid crystal display panel, a sidelight-type spread illuminating apparatus (backlight) in which an LED, which is compact and has superior environmental compatibility, is arranged along a side end surface of a light guide plate, has been widely used mainly in the fields of compact portable information devices such as mobile phones and the like. Recently, in order to accommodate even thinner compact portable information devices, light guide plates in which an inclined part that tapers in thickness away from the side end surface (hereinafter, also referred to as the incident light surface) at which the LED is arranged is formed between the incident light surface and an emitting portion are being used. The use of such a light guide plate allows the emitting portion of the light guide plate to be formed thinner regardless of the thickness of the LED.

In this type of spread illuminating apparatus, an LED is normally arranged opposing the incident light surface of the light guide plate in a state that it is mounted on a strip-shaped circuit board. In this configuration, the front portion of the circuit board is tightly fixed to a portion of the light guide plate (including an inclined surface of the inclined part) near the incident light surface to fix the positioning of the LED relative to the light guide plate.

Conventionally, in this kind of spread illuminating apparatus, when light which has been emitted from the LED and entered into the light guide plate is reflected on the inclined surface, it is absorbed by the circuit board tightly fixed to the inclined surface. Further, a light-emitting surface of the LED cannot be faced in parallel to the incident light surface of the light guide plate in a state that the circuit board is tightly fixed to the inclined surface of the light guide plate. Therefore, there has been a problem in that a portion of the light which has been emitted from the light-emitting surface of the LED leaks to the outside without entering the incident light surface of the light guide plate, and this causes a decrease in the brightness of the illumination light.

Thus, in order to solve the above-described problem and increase the brightness of the illumination light, the present applicants first proposed the following spread illuminating apparatus (refer to Japanese Patent Application Laid-Open (JP-A) No. 2011-96523).

FIG. 5 is a cross-section view schematically illustrating the overall structure of a spread illuminating apparatus showing one example given in JP-A 2011-96523. In the spread illuminating apparatus 100 shown in FIG. 5, a light guide plate 121 includes an incident light part 126 formed in front of an incident light surface 122, an inclined part 127 that is formed continuously with the incident light part 126 and tapers in thickness toward the forward direction, and an emitting portion 128 that is formed in front of the inclined part 127 and emits from an emitting surface 125 light from an LED 111 guided through the inclined part 127. A pedestal 129 for fixing an FPC 131 is formed in a region excluding a portion in front of the LED 111 of an inclined surface 127a of the inclined part 127 formed near the incident light surface 122 of the light guide plate 121 so that a principal flat surface 129a of the pedestal 129 is approximately orthogonal to the incident light surface 122 of the light guide plate 121.

In the spread illuminating apparatus 100, according to the above-described structure, a light-emitting surface 112 of the LED 111 faces approximately in parallel the incident light surface 122 of the light guide plate 121 in a state that the FPC 131 is fixed to the pedestal 129. Therefore, light which has been emitted from the light-emitting surface 112 of the LED 111 can be efficiently introduced into the light guide plate 121 without any light leakage. In this way, the spread illuminating apparatus 100 solves the above-described problem and achieves an increase in the brightness of the illumination light.

Further, in the spread illuminating apparatus 100, in a state that the FPC 131 is fixed to the pedestal 129, a gap is formed between the inclined surface 127a at the portion in front of the LED 111 and a surface 131a of the FPC 131 on the side that opposes the inclined surface 127a. Therefore, an effect is obtained by which light entering into the light guide plate 121 and is reflected on the inclined surface 127a is prevented from being absorbed by the FPC 131, thereby achieving an increase in the brightness of the illumination light.

SUMMARY OF THE INVENTION

In this way, the spread illuminating apparatus 100 shown in FIG. 5 achieves an operational effect as described above with regard to increasing the brightness of the illumination light. However, there is a room still left for further improvement as described hereinbelow for further increasing the brightness.

As shown in FIG. 5, in a general arrangement of the LED 111, a fixed gap g (normally about 0.2 mm) is provided between the light-emitting surface 112 of the LED 111 and the incident light surface 122 of the light guide plate 121 as a clearance for dealing with heat deformation of the light guide plate 121 and the like. Therefore, in the conventional spread illuminating apparatus 100, part of the light that is emitted from the LED 111 enters into a portion of the FPC 131 that covers the top of the gap g instead of entering the incident light surface 122 of the light guide plate 121, and then passes through the FPC 131 or is absorbed by the FPC 131. Thereby, such light becomes leaked light not utilized as illumination light. Accordingly, it is preferable to reduce this kind of light leakage in order to achieve a further increase in the brightness of the illumination light.

In recent, since a demand of further decreases in the thickness of the light guide plate has been particularly increasing, it is becoming necessary to make the height of the incident light surface 122 of the light guide plate 121 (the thickness of the incident light part 126) equivalent to or slightly less than the height of the LED 111 from the mounting flat surface 131a of the FPC 131, even when an inclined surface 127 is provided to the light guide plate 121 to decrease the thickness of the emitting portion 128. In this case, since the leakage of light to the top of the LED 111 increases, the problem of decreasing the leakage of light from the portion of the FPC 131 that covers the top of the gap g becomes even more important.

In the spread illuminating apparatus 100, so light from the inclined surface 127a of the inclined part 127 is emitted as leaked light, and this leaked light may impair the uniformity of the illumination light if it progresses to the emitting surface 125 side. Thus, in the spread illuminating apparatus 100, a light-absorbing member 132 is arranged on the FPC 131 so as to cover at least part of the inclined surface 127a of the light guide plate 121 as well as a portion of the emitting surface 125 near the inclined surface 127a. Thereby, even if some light leaks out from the inclined part 127, the leaked light will be absorbed by the light-absorbing member 132, and thus the uniformity of the illumination light can be improved.

However, in the above structure, although a certain level of effect may be achieved for improving the uniformity of the illumination light, further improvement is possible in the following respect. In order to make the light-emitting surface 112 of the LED 111 and the incident light surface 122 of the light guide plate 121 face each other in parallel with high precision as in the spread illuminating apparatus 100, in a case that the FPC 131 is fixed to the pedestal 129 having an upper surface 129a perpendicular to the incident light surface 122, an interval between the inclined surface 127a of the inclined part 127 and the FPC 131 in front of the LED 111 increases toward the forward direction, and the front of the inclined surface 127a opens by a height D of the pedestal 129 from the emitting surface 125 at a front end side of the pedestal 129 (boundary portion between the pedestal 129 and the emitting surface 125).

As a result, even if the light-absorbing member 132 is arranged on the FPC 131, leaked light from the inclined surface 127a of the inclined part 127 progresses to the emitting surface 125 without being absorbed by the light-absorbing member 132 and may become noise light that impairs the uniformity of the brightness.

Considering the above problems, a first object of the present invention is to provide a spread illuminating apparatus that is capable of decreasing leakage of light from near an incident light surface of a light guide plate to achieve an increase in the brightness of the illumination light. A second object of the present invention is to provide a spread illuminating apparatus that is capable of decreasing leakage of light from near an incident light surface of a light guide plate to improve the uniformity of the brightness of the illumination light.

The embodiments of the invention described below are examples of the structure of the present invention. In order to facilitate the understanding of the various structures of the present invention, the explanations below are divided into aspects. Each aspect does not limit the technical scope of the present invention, and the technical scope of the present invention may also include structures in which a portion of the constituent components in the aspects below are substituted or deleted, or another constituent component is added upon referring to the best modes for carrying out the invention.

According to a first aspect of the present invention, there is provided a spread illuminating apparatus comprising: a point light source having a light-emitting surface that emits light toward a forward direction, a circuit board having a mounting surface on which the point light source is mounted, and a light guide plate having an incident light surface on which the point light source is arranged, and an emitting surface that emits light that has introduced from the incident light surface, the light being adapted to advance in a widely spread manner, wherein the circuit board is arranged as that at least a partial portion of the circuit board extends beyond an area where the point light source is mounted so as to be superposed on the light guide plate, a light-reflecting member is arranged on the mounting surface, and a region of the mounting surface in which the light-reflecting member is arranged includes a first region that extends forward from a position corresponding to the center of the light-emitting surface of the point light source.

According to this structure, a light-reflecting member is arranged on the mounting surface of the circuit board on which the point light source is mounted and a first region that extends forward from a position corresponding to the center of the light-emitting surface of the point light source is included in a region of the mounting surface in which the light-reflecting member is arranged. Thereby, even if a gap exists between the light-emitting surface of the point light source and the incident light surface of the light guide plate, at least a part of the light to be entered into a portion of the circuit board covering the gap is reflected by the light-reflecting member placed in the first region and then enters into the incident light surface of the light guide plate. It is thus possible to decrease light that passes through the circuit board via the portion of the circuit board which covers the above-mentioned gap or light that is absorbed into the circuit board, and thus it is possible to achieve an increase in the brightness of the illumination light.

In the spread illuminating apparatus of the first aspect, the region of the mounting surface of the circuit board in which the light-reflecting member is arranged includes a second region having a portion that extends rearward from a position corresponding to the center of the light-emitting surface of the point light source.

According to this structure, a second region having a portion that extends rearward from a position corresponding to the center of the light-emitting surface of the point light source is included in a region of the mounting surface of the circuit board in which the light-reflecting member is arranged. Thereby, the light-reflecting member is also arranged in a portion of the mounting surface of the circuit board that corresponds to the bottom surface of the point light source (a surface opposing the mounting surface when mounted on the circuit board), and at least a part of the leaked light from the bottom surface of the point light source is reflected by the light-reflecting member and then enters into the incident light surface of the light guide plate. It is thus possible to achieve a further increase in the brightness of the illumination light.

In the spread illuminating apparatus of the first aspect, the light-reflecting member is constituted by a cover lay film that covers the mounting surface of the circuit board.

With this structure, the light-reflecting member arranged on the mounting surface of the circuit board is associated with the first region and the second region of the mounting surface, and can be formed easily and with high precision.

In the spread illuminating apparatus of the first aspect, the light-reflecting member is constituted by a cover lay film that covers the mounting surface of the circuit board, the point light source has a pair of terminals placed at both ends in a direction along a lengthwise direction of the incident light surface of the light guide plate, a pair of openings is formed in the cover lay film as that a pair of electrode pads corresponding to the pair of terminals of the point light source is exposed, and the light-reflecting member placed in the second region is provided between the pair of openings.

With this structure, the light-reflecting member arranged on the mounting surface of the circuit board is associated with the first region and the second region of the mounting surface, and can be formed easily and with high precision. In particular, the positioning of the point light source when mounting on the circuit board is performed through a pair of openings as a reference, the pair of openings being provided to the cover lay film so that a pair of electrode pads corresponding to the pair of terminals of the point light source are exposed. Therefore, by providing the second region between such a pair of openings, it is possible to arrange the light-reflecting member with high precision relative to the light-emitting surface and the bottom surface of the point light source.

In the spread illuminating apparatus of the first aspect, the second region has a portion that extends forward from a position corresponding to the center of the light-emitting surface of the point light source, and the forward extended portion includes a portion that spreads out like a fan in the forward direction.

According to this structure, the light-reflecting member that spreads out like a fan toward the forward direction is arranged in a portion of the mounting surface of the circuit board that is in front of the light-emitting surface of the point light source. Thereby, light which has been emitted from the point light source and progressed forward with a predetermined spread angle can be efficiently reflected and a further increase in the brightness of the illumination light can be achieved.

In the spread illuminating apparatus of the first aspect, the light guide plate has an inclined part that tapers in thickness from the incident light surface side toward the forward direction, a pedestal having a receiving surface on which the circuit board is arranged is formed in a region excluding a portion in front of the point light source on an inclined surface side of the inclined part, and the receiving surface of the pedestal includes a first surface that is formed on the incident light surface side and a second surface that is placed in front of the first surface and extends in the forward direction as being inclined toward the inclined part side.

With this structure, by forming a pedestal having a receiving surface on which the circuit board is arranged in a region excluding a portion in front of the point light source, a gap is formed between the inclined surface at the portion in front of the point light source and the circuit board in a state that the circuit board is fixed to the pedestal. Light which has reached the inclined surface upon entering the light guide plate is thus prevented from being directly absorbed by the circuit board, and light emitted from the point light source can be efficiently guided via the inclined part. Here, in addition to this effect, the following effect is also achievable.

According to the structure of this aspect, the receiving surface of the pedestal includes a first surface that is formed on the incident light surface side and a second surface that is formed in front of the first surface and is inclined toward the inclined part side from the first surface side toward the forward direction. Thereby, in a state that the positional relationship between the light-emitting surface of the point light source and the incident light surface of the light guide plate is stably maintained, the interval between the emitting surface at the portion in front of the point light source and the front end side of the circuit board fixed to the receiving surface of the pedestal becomes narrow. Accordingly, in this structure, even if some light leaks out from the inclined surface of the inclined part, the leaked light can be effectively inhibited from progressing toward the emitting surface side by reflection or absorption by the portion of the circuit board covering the inclined surface, and thus the uniformity of the brightness of the illumination light can be improved.

According to the structure of this aspect, the light-absorbing member or the light-reflecting member is preferably arranged in a portion of the mounting surface of the circuit board that covers at least the inclined surface of the inclined part. The uniformity of the brightness of the illumination light can be thus further improved.

In the spread illuminating apparatus of the first aspect, the first surface of the pedestal is formed approximately perpendicular relative to the incident light surface.

According to this structure, the light-emitting surface of the point light source faces approximately in parallel the incident light surface of the light guide plate in a state that the circuit board is fixed to the receiving surface of the pedestal. Light that has been emitted from the light-emitting surface of the point light source can be efficiently introduced into the light guide plate, and an increase in the brightness of the illumination light can be achieved.

In the spread illuminating apparatus of the first aspect, an inclination angle of the second surface of the pedestal is smaller than an inclination angle of the inclined surface of the inclined part.

With this structure, compared to a case that the inclination angle of the second surface of the pedestal is set equal to or greater than the inclination angle of the inclined surface of the inclined part, the present invention can allow the surface area of the second surface to be larger. Accordingly, the surface area for adhering the circuit board increases and the long-term stability of the fixation of the circuit board to the light guide plate is improved.

Further, with this structure, in a case that the circuit board is made by a flexible print circuit board (FPC) and the FPC is arranged in a state that it is bent in the boundary of the first surface and the second surface of the receiving surface of the pedestal, the reactive force due to the bending is decreased, and thus this structure will be particularly advantageous in long-term stability of the fixation of the circuit board to the light guide plate.

According to a second aspect of the present invention, there is provided a spread illuminating apparatus comprising: a point light source having a light-emitting surface that emits light toward a forward direction, a circuit board on which the point light source is mounted, and a light guide plate having an incident light surface on which the point light source is arranged and an emitting surface that emits light that has introduced from the incident light surface, the light being adapted to advance in a widely spread manner, wherein the light guide plate has an inclined part that tapers in thickness from the incident light surface side toward the forward direction, a pedestal having a receiving surface on which the circuit board is arranged is formed in a region excluding a portion in front of the point light source on an inclined surface side of the inclined part, and the receiving surface of the pedestal includes a first surface that is formed on the incident light surface side and a second surface that is placed in front of the first surface and extends in the forward direction as being inclined toward the inclined part side.

With this structure, by forming the pedestal having the receiving surface on which the circuit board is arranged in a region excluding a portion in front of the point light source, a gap is formed between the inclined surface at the portion in front of the point light source and the circuit board in a state that the circuit board is fixed to the pedestal. Light which has reached the inclined surface upon entering the light guide plate is thus prevented from being directly absorbed by the circuit board, and light emitted from the point light source can be efficiently guided via the inclined part. In addition to this effect, the following effect is achievable.

According to the structure of this aspect, the receiving surface of the pedestal includes a first surface that is formed on the incident light surface side and a second surface that is formed in front of the first surface and is inclined toward the inclined part side from the first surface side toward the forward direction. Thereby, the interval between the inclined surface at the portion in front of the point light source and the circuit board fixed to the receiving surface of the pedestal becomes narrow toward the forward direction. Thereby, in the structure of this aspect, even if some light leaks out from the inclined surface of the inclined part, the leaked light can be effectively inhibited from progressing to the emitting surface side by reflection or absorption by the portion of the circuit board covering the inclined surface, and thus the uniformity of the brightness of the illumination light can be improved.

Further, since the first surface is provided to the receiving surface of the pedestal, the positional relationship between the light-emitting surface of the point light source and the incident light surface of the light guide plate can be stably maintained. Also, since the first surface does not exist at the portion in front of the light source, the inclined part may be arranged toward the incident light surface. Therefore, the inclined part may be arranged away from an effective emitting region of the emitting surface, and it is possible to reduce any negative effects on the brightness uniformity of the illumination light leaking out from the inclined surface of the inclined part.

According to the structure of this aspect, the light-absorbing member or the light-reflecting member is preferably arranged in a portion of the circuit board that covers at least the inclined surface of the inclined part. Thereby, the uniformity of the brightness of the illumination light can be further improved.

In the spread illuminating apparatus of the second aspect, the first surface of the pedestal is formed approximately perpendicular relative to the incident light surface.

According to this structure, the light-emitting surface of the point light source faces approximately in parallel the incident light surface of the light guide plate in a state that the circuit board is fixed to the receiving surface of the pedestal. Thereby, light that has been emitted from the light-emitting surface of the point light source can be efficiently introduced into the light guide plate, and an increase in the brightness of the illumination light can be achieved. Further, since the surface area for adhering the circuit board to the receiving surface of the pedestal can be increased without bending the circuit board, the long-term stability of the fixation of the circuit board to the light guide plate is improved.

In the spread illuminating apparatus of the second aspect, an inclination angle of the second surface of the pedestal is smaller than an inclination angle of the inclined surface of the inclined part.

With this structure, compared to a case that the inclination angle of the second surface of the pedestal is set equal to or greater than the inclination angle of the inclined surface of the inclined part, the present invention allows the surface area of the second surface to be larger, and thus the surface area for adhering the circuit board increases and the long-term stability of the fixation of the circuit board to the light guide plate is improved.

Further, with this structure, in a case that the circuit board is made by a flexible print circuit board (FPC) and the FPC is arranged in a state that it is bent in the boundary of the first surface and the second surface of the receiving surface of the pedestal, the reactive force due to the bending is decreased, and thus this structure is particularly advantageous in long-term stability of the fixation of the circuit board to the light guide plate.

In the spread illuminating apparatus of the second aspect, the light guide plate includes a flat part having a thickness that is approximately constant between the incident light surface and the inclined part.

According to this structure, the circuit board is fixed on a flat part as well when fixing the circuit board to the light guide plate. Thereby, the surface area for adhering the circuit board to the light guide plate increases and the positioning and fixing of the light guide plate and the point light source is stabilized, and thus the uniformity of the brightness of the illumination light can be stably maintained over a longer period of time.

According to the present invention, in a spread illuminating apparatus including a point light source having a light-emitting surface that emits light toward the forward direction, a circuit board having a mounting surface on which the point light source is mounted, and a light guide plate having an incident light surface on which the point light source is arranged and an emitting surface that emits light that has entered from the incident light surface in a widely spread manner, the circuit board is arranged as that at least a partial portion of the circuit board extends beyond an area where the point light source is mounted so as to be superposed on the light guide plate, a light-reflecting member is arranged on the mounting surface, and a region of the mounting surface in which the light-reflecting member is arranged includes a first region that extends forward from a position corresponding to the center of the light-emitting surface of the point light source. Leakage of light from near the incident light surface of the light guide plate can be thus decreased and an increase in the brightness of the illumination light can be achieved.

In addition, according to the present invention, in a spread illuminating apparatus including a point light source having a light-emitting surface that emits light toward the forward direction, a circuit board on which the point light source is mounted, and a light guide plate having an incident light surface on which the point light source is arranged and an emitting surface that emits light that has entered from the incident light surface in a widely spread manner, the light guide plate has an inclined part that tapers in thickness from the incident light surface side toward the forward direction, a pedestal having a receiving surface on which the circuit board is arranged is formed in a region excluding a portion in front of the point light source on an inclined surface side of the inclined part, and the receiving surface of the pedestal includes a first surface that is formed on the incident light surface side and a second surface that is formed in front of the first surface and is inclined toward the inclined part side from the first surface side toward the forward direction. Thereby, in a state that the positional relationship between the light-emitting surface of the point light source and the incident light surface of the light guide plate is stably maintained, leakage of light from the inclined part which is formed so as to taper in thickness from the incident light surface side toward the forward direction can be inhibited from progressing to the emitting surface side, and thus the uniformity of the brightness of the illumination light can be improved.

DETAILED DESCRIPTION OF THE PREFERRED EMBODIMENTS

Figure 1:
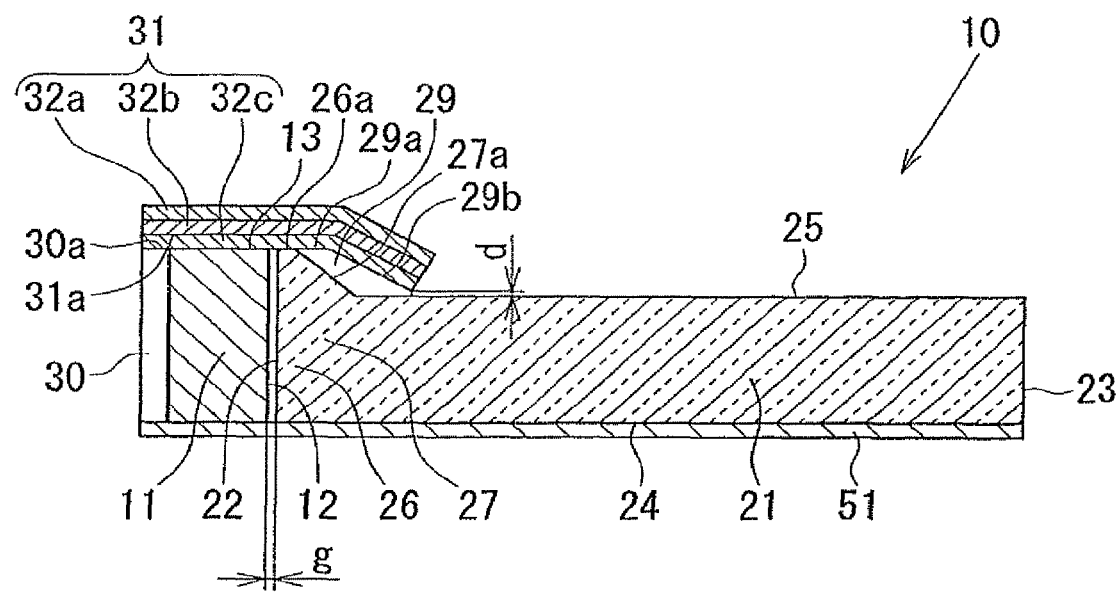
FIG. 1 is a cross-section view schematically illustrating the essential parts of a spread illuminating apparatus according to one embodiment of the present invention.

A spread illuminating apparatus 10 according to embodiments of the present invention will be explained below referring to the drawings. In the drawings shown below, the shape, dimensions, and the like of each constituent component are appropriately exaggerated to facilitate the understanding of the present invention.

As shown in FIG. 1, the spread illuminating apparatus 10 includes an LED 11 as a point light source, a light guide plate 21 for emitting light that has been emitted from the LED 11 in a widely spread manner, and an FPC (Flexible Printed Circuit Board) 31 as a circuit board on which the LED 11 is mounted.

In the present embodiment, the LED 11 is a pseudo white LED including a blue LED and a yellow fluorescent body, and the LED 11 is a so-called side view LED that is formed in an overall rectangular parallelepiped shape and has a light-emitting surface 12 on one side surface. In other words, in the LED 11, a surface (hereinafter also referred to as a "bottom surface") 13 that is mounted on an FPC 31 and the light-emitting surface 12 are approximately orthogonal to each other. In the present embodiment, three LEDs 11 are arranged along incident light surfaces 22 (to be explained later) of light guide plates 21 and spaced apart from each other by predetermined intervals in a state that the light-emitting surfaces 12 of the LEDs 11 are facing the incident light surfaces 22 of the light guide plates 21 (refer to FIG. 2). A gap g (for example, approximately 0.2 mm) is provided between the light-emitting surface 12 of each LED 11 and the incident light surface 22 of each light guide plate 21 as a clearance for dealing with heat deformation of the light guide plates 21 and the like.

Next, the light guide plate 21 is formed in a rectangular shape when viewed from the top surface using a transparent material (in the present embodiment, a polycarbonate resin is used). The light guide plate 21 has the following on its exterior: an incident light surface 22 which is the end surface on the side at which the LED 11 is arranged, an opposing end surface 23 which is the end surface opposing the incident light surface 22, a reflective surface 24 that is one of the principal flat surfaces that is approximately orthogonal to the incident light surface 22, and an emitting surface 25 that is the other principal flat surface that opposes in parallel the reflective surface 24.

In the present invention, the direction in which the incident light surface 22 faces the opposing end surface 23 (therefore, it is also the direction in which the light-emitting surface 12 of the LED 11 faces, as well as the light guide direction) is defined as the "forward direction", the direction in which the reflective surface 24 faces the emitting surface 25 is defined as the "upward direction", and the direction that is orthogonal to the front-back direction and the up-down direction (the lengthwise direction of the incident light surface 22) is referred to as the left-right direction (when necessary, it may be defined as the "right direction" and the "left direction" with respect to the forward direction). Further, unless explicitly stated otherwise, the "length", "thickness", and "width" respectively refer to the dimensions in the front-back direction, the up-down direction, and the left-right direction.

Figure 2:
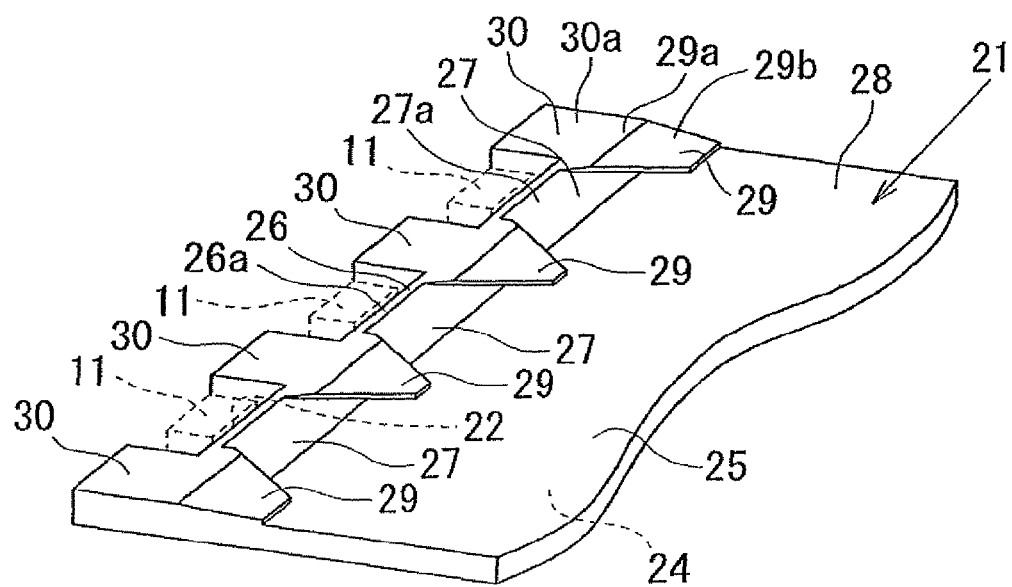
FIG. 2 is a partially enlarged perspective view illustrating the essential parts of a light guide plate, which is a constituent component of the spread illuminating apparatus shown in FIG. 1.

As shown in FIG. 2, the light guide plate 21 has a flat part 26 formed in front of the incident light surface 22, an inclined part 27 that is formed continuous with the flat part 26 and tapers in thickness along the forward direction, and an emitting portion 28 that is formed in front of the inclined part 27 and emits light from the LED 11 that has been guided through the inclined part 27 out of the emitting surface 25.

The flat part 26 has a constant thickness along the forward direction, and is formed so that a top surface 26a, which is the surface on the emitting surface 25 side, is approximately orthogonal to the incident light surface 22. The inclined part 27 is made by providing an inclined surface 27a, which inclines at a fixed slope approaching the reflective surface 24 side along the forward direction, on the emitting surface 25 side along the lengthwise direction of the incident light surface 22.

The emitting portion 28 is formed in a flat rectangular shape having a constant thickness, and an optical path changing pattern made of, for example, a plurality of dots is formed on the reflective surface 24 side of the emitting portion 28. By forming the optical path changing pattern, the direction of progression of light guided through the emitting portion 28 can be changed to emit the light in a widely spread manner from the emitting surface 25.

A reflective sheet 51 for returning light that has leaked from the reflective surface 24 back to the light guide plate 21 is arranged on the reflective surface 24 side of the light guide plate 21. Although not illustrated, similar to the conventional spread illuminating apparatus 100 shown in FIG. 5, in the spread illuminating apparatus 10, a diffusion sheet (152 in the example of FIG. 5) and a pair of prism sheets (153 and 154 in the example of FIG. 5) for controlling the directivity of light emitted from the emitting surface 25 are typically sequentially layered on the emitting surface 25 side of the emitting portion 28. Also, similar to the conventional spread illuminating apparatus 100 shown in FIG. 5, the spread illuminating apparatus 10 may include a frame (141 in the example of FIG. 5) that accommodates the constituent components.

In the spread illuminating apparatus 10, the light guide plate 21 further includes a plurality of pedestals 29 (four in the present embodiment) formed separated from each other on the inclined surface 27a side of the inclined part 27, and a plurality of pawls 30 (four in the present embodiment) formed separated from each other so as to protrude rearward from the incident light surfaces 22.

The four pedestals 29 are for fixing (installing) the FPCs 31, and are formed spaced apart from each other on the inclined surfaces 27a and portions of the emitting surface 25 near the inclined surfaces 27a so that they do not exist at portions in front of the three LEDs 11 (shown by dashed lines in FIG. 2). The top surface of each pedestal 29 functions as a receiving surface onto which the FPC 31 is installed, and includes a first surface 29a that is formed on the incident light surface 22 side and a second surface 29b that is formed in front of the first surface 29a and is inclined toward the inclined part 27 side from the first surface 29a side in the forward direction. The shape of the pedestal 29 when viewed from the top surface is formed so that the width is becoming narrowed toward the forward end side along the forward direction.

In each pedestal 29, the thickness is constant along the forward direction from the incident light surface 22 to the boundary with the second surface 29b, and the first surface 29a, which constitutes the top surface of each pedestal 29 between the incident light surface 22 and the second surface 29b, is formed approximately orthogonal to the incident light surface 22. The first surface 29a is formed approximately flush with the top surface 26a of the Out part 26. In other words, the first surface 29a of each pedestal 29 is in a form that extends the flat part 26 forward excluding the portion in front of the LED 11.

The second surface 29b of each pedestal 29 is formed inclining more gently than the inclined surface 27a of the inclined part 27. The inclination angle of the second surface 29b of the pedestal 29 relative to the emitting surface 25 is smaller than the inclination angle of the inclined surface 27a of the inclined part 27 relative to the emitting surface 25.

The pawls 30 are for fixing the FPCs 31 similar to the pedestals 29, and each pawl 30 is formed in a rectangular shape extending toward the rear from both sides of a region of the incident light surface 22 which the LED 11 faces. A top surface 30a of each pawl 30 is formed so that it is approximately flush with the top surface 26a of the flat part 26 and the first surface 29a of the pedestal 29.

In the case that the FPC 31 is partially joined with a portion of the top surface 26a of the flat part 26, the first and second surfaces 29a and 29b of the pedestal 29 and the top surface 30a of the pawl 30, a recessed part in which an adhesive material (for example, double-sided tape) is arranged may be provided to the surface part that is partially joined.

Figure 3A:
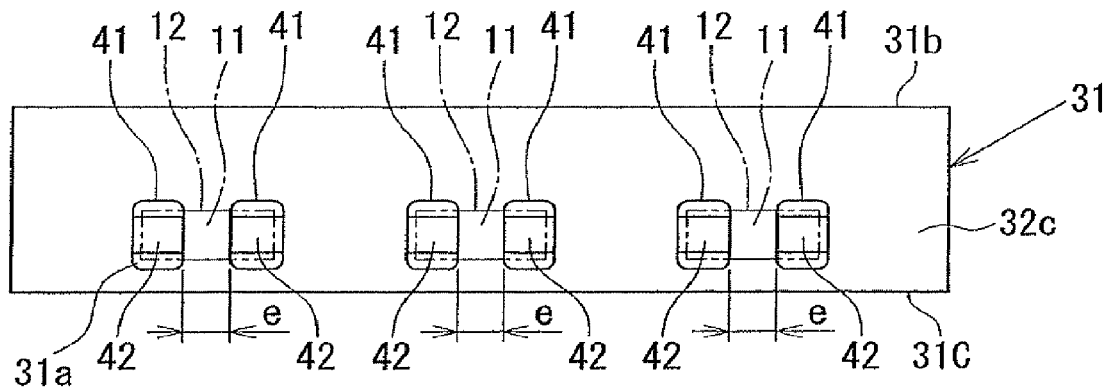
FIG. 3A is a plan view when viewed from a white cover lay film side of an FPC, which is a constituent component of the spread illuminating apparatus shown in FIG. 1, and FIGS. 3B and 3C are partially enlarged views of FIG. 3A.

Next, the FPC 31 includes a base film 32a, an electrically conductive circuit 32b formed on one surface of the base film 32a, and a white cover lay film 32c that is layered so as to cover a surface of the base film 32a on which the electrically conductive circuit 32b is formed and affixed with an adhesive layer or the like to each other (not illustrated). As shown in FIG. 3A, the FPC 31 is formed in a strip-shape when viewed from the top surface, and the width (dimension of the long sides 31b and 31c) is formed to be approximately the same as the dimension in the lengthwise direction of the incident light surface 22 of the light guide plate 21.

In the present invention, in the FPC 31, the surface of the base film 32a on which the electrically conductive circuit 32b is formed is called a mounting surface 31a of the FPC 31 including the electrically conductive circuit 32b formed thereon.

In the spread illuminating apparatus 10, the LED 11 has a pair of terminals (not illustrated) arranged at both ends in the lengthwise direction of the incident light surface 22 of the light guide plate 21. A pair of electrode pads 42 corresponding to the pair of terminals of the LED 11 is included in the electrically conductive circuit 32b of the FPC 31. A pair of approximately rectangular openings 41 is formed in the white cover lay film 32c so that the pair of electrode pads 42 of the LED 11 is exposed.

Here, the white cover lay film 32c includes a white reflective layer across its entire surface, and the white cover lay film 32c itself functions as a light-reflecting member. For example, the white reflective layer may be formed by applying a white paint on a surface of the film substrate constituting the white cover lay film 32c on the opposite side of the surface attached to the mounting surface 31a. Alternatively, the white cover lay film 32c may be formed from a film substrate that is whitened by a means such as dispersing a white pigment or the like, such that the film substrate itself forms the white reflective layer.

The FPC 31 is made by forming the necessary openings 41 (for example, by punching) on the white cover lay film 32c that is provided in advance with a white reflective layer across its entire surface as described above, and then adhering the white cover lay film 32c onto the mounting surface 31a. Each LED 11 is mounted on the mounting surface 31a by joining the corresponding terminals by soldering or the like to the pair of electrode pads 42 exposed from the corresponding pair of openings 41. When mounting, the three LEDs 11 are mounted along the long sides 31c on the rear side of the FPCs 31 in a state that the light-emitting surfaces 12 of the LEDs 11 are approximately orthogonal to the mounting surfaces 31a and approximately parallel to the long sides 31b and 31c.

In the FPC 31, at least part of a portion in front of the portion on which the LED 11 is mounted is fixed onto the light guide plate 21 (specifically, onto the top surface 26a of the flat part 26 and the first and second surfaces 29a and 29b of the pedestal 29). Therefore, each dimension of the short sides of the FPC 31 is set so that the length just allows a portion necessary for fixation to exist in front of the portion on which the LED 11 is mounted.

In the example shown in FIG. 3, at both ends in the left-right direction of the light-emitting surface 12 of the LED 11, the positions of the mounting surface 31a corresponding to both ends mentioned above are within the openings 41 of the white cover lay film 32c, and portions that are not covered by the white cover lay film 32c exist directly in front of the positions of the mounting surface 31a corresponding to both ends up to the outline of the openings 41.

However, among the positions of the mounting surface 31a corresponding to the light-emitting surface 12 of the LED 11, with regard to the portion between the pair of openings 41, or in other words a position corresponding to the center in the left-right direction of the light-emitting surface 12 of the LED 11, the white cover lay film 32c covers a region extending from the above-mentioned position toward the forward direction.

Figure 3B:
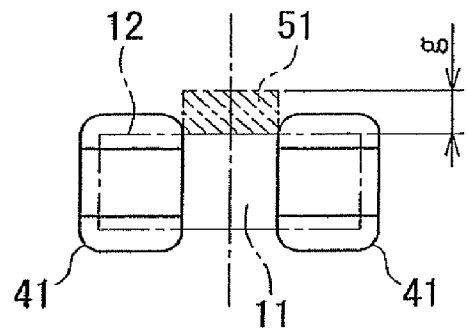

In this way, in the FPC 31, a portion exists in the white cover lay film 32c that extends from a position corresponding to the center in the left-right direction of the light-emitting surface 12 of the LED 11 toward the forward direction. Thereby, as shown in FIG. 3B, a structure is realized in which a light-reflecting member is arranged in a first region 51 of the mounting surface 31a that extends from a position corresponding to the center in the left-right direction of the light-emitting surface 12 of the LED 11 toward the forward direction.

The present invention is not limited by the length of the first region 51 that extends from a position corresponding to the light-emitting surface 12 of the LED 11 toward the forward direction. However, the first region 51 preferably has a length that is identical to the gap g between the light-emitting surface 12 of the LED 11 and the incident light surface 22 of the light guide plate 21, and more preferably has a length that is equal to or greater than the gap g (FIG. 3B illustrates one example of the first region 51 that has a length that is the same as the gap g).

Of course, in the FPC 31, since the light-reflecting member is constituted by the white cover lay film 32c and the FPC 31 has a length that just allows a portion for fixation onto the light guide plate 21 to exist at a portion in front of the LED 11, the light-reflecting member that covers the first region 51 necessarily exists in the first region 51 regardless of whether the length of the first region 51 is defined to be longer or shorter than the gap g.

Figure 3C:
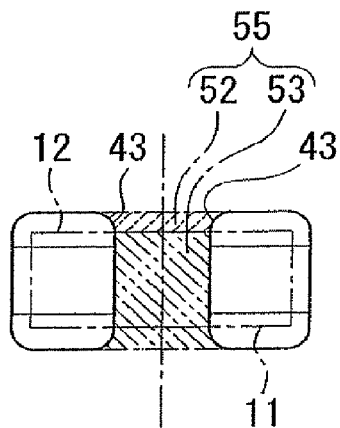

In the FPC 31, a band-shaped portion is formed on the white cover lay film 32c between the pair of openings 41. Therefore, in the FPC 31, since this band-shaped portion exists on the white cover lay film 32c, a structure is realized as shown in FIG. 3C in which a light-reflecting member is arranged in a second region 55 of the mounting surface 31a of the FPC 31 that includes a portion extending forward (hereinafter also referred to simply as "forward portion") 52 and a portion extending rearward (hereinafter also referred to simply as "rearward portion") 53 from a position corresponding to the center in the left-right direction of the light-emitting surface 12 of the LED 11.

Here, in the FPC 31, the openings 41 are formed to have R parts in which the four corners of the rectangle that forms the outline thereof are rounded. Therefore, the front end of the band-shaped portion of the white cover lay film 32c formed between the pair of openings 41 spreads out like a fan toward the front direction along the shape of the opposing R parts 43 of the pair of openings 41. Accordingly, in the FPC 31, a structure is realized by the front end of the band-shaped portion of the white cover lay film 32c in which the light-reflecting member is arranged in the forward portion 52 of the second region 55 that includes a portion that spreads out like a fan toward the front direction.

Figure 4A:
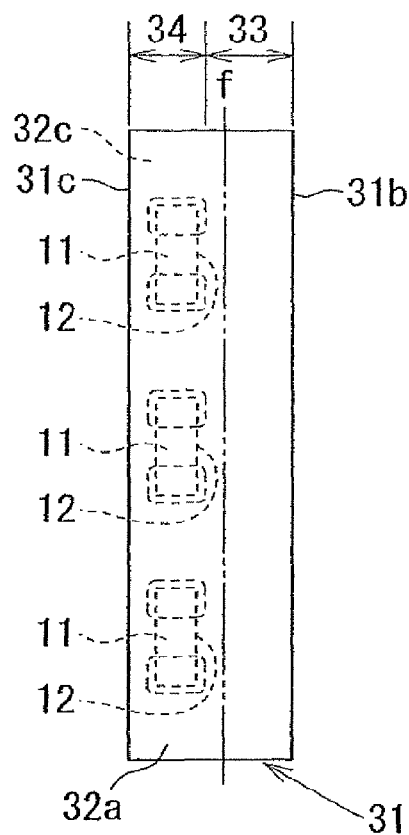
FIG. 4A is a plan view when viewed from a base film side of an FPC, which is a constituent component of the spread illuminating apparatus shown in FIG. 1.

As shown in FIG. 4, the FPC 31 on which the LED 11 is mounted is adhesively fixed onto the light guide plate 21 while being aligned so that the light-emitting surface 12 of the LED 11 opposes a predetermined position (between adjacent pawls 30 and 30) of the incident light surface 22 of the light guide plate 21 and a predetermined gap g is provided between the light-emitting surface 12 and the incident light surface 22 of the light guide plate 21.

When aligning the FPC 31, the first and second surfaces 29a and 29b of the pedestal 29, the top surface 26a of the flat part 26, and the top surface 30a (cross-hatched portions in FIG. 4B) of the pawl 30 serve as the joining surface (contact surface) with the white cover lay film 32c of the FPC 31. By fixing the FPC 31 onto the light guide plate 21 in this way, the LED 11 is positioned and fixed onto the light guide plate 21.

The FPC 31 can also be partially joined instead of joined to the entire surfaces of the top surface 26a of the flat part 26, the first and second surfaces 29a and 29b of the pedestal 29, and the top surface 30a of the pawl 30 as described above.

By constituting the spread illuminating apparatus 10 as described above, light that is emitted from the LED 11 can be led to the emitting portion 28 via the flat part 26 and the inclined part 27 of the light guide plate 21 such that it can be emitted from the emitting surface 25 of the emitting portion 28 as spread light.

Next, the unique operation and effects of the spread illuminating apparatus 10 according to this embodiment of the present invention will be explained.

In the spread illuminating apparatus 10, a portion arranged in the first region 51 of the mounting surface 31a exists in the white cover lay film 32c (light-reflecting member) of the FPC 31. Thereby, at least part of the light that enters a portion of the FPC 31 that covers the gap g between the light-emitting surface 12 of the LED 11 and the incident light surface 22 of the light guide plate 21 is reflected by the portion of the cover lay film 32c arranged in the first region 51 and enters the incident light surface 22 of the light guide plate 21. Therefore, it is possible to decrease light that passes through the FPC 31 via the portion of the FPC 31 that covers the above-mentioned gap g or light that is absorbed by the FPC 31, and thus it is possible to achieve an increase in the brightness of the illumination light.

In the LED 11, an LED chip (dice) is normally stored in a position of a lamp house corresponding to the center of the light-emitting surface 12, and emission light from the LED 11 is emitted in the forward direction with comparatively high directivity from the center of the light-emitting surface 12. Therefore, in the spread illuminating apparatus 10, the structure in which a portion of the mounting surface 31a of the FPC 31 arranged in the first region 51 that extends forward from a position corresponding to the center in the left-right direction of the light-emitting surface 12 of the LED 11 exists in the cover lay film 32c is advantageous because most of the light that enters the portion of the FPC 31 that covers the above-mentioned gap g is introduced into the light-reflecting member. Thereby, it is possible to achieve an increase in the brightness of the illumination light.

In general, the lamp house of the LED 11 is made by a white resin, and a certain amount of leakage light from the lamp house also exists in the LED 11 in addition to the light emitted from the light-emitting surface 12. However, in the spread illuminating apparatus 10, since a portion of the mounting surface 31a of the FPC 31 arranged in the rearward portion 53 of the second region 55 exists in the white cover lay film 32c, the light-reflecting member is also arranged in a portion of the mounting surface 31a of the FPC 31 corresponding to the bottom surface 13 (the surface opposing the mounting surface 31a when mounting on the FPC 31) of the LED 11. Thus, at least part of the leakage light from the bottom surface of the LED 11 is reflected by the light-reflecting member and enters into the incident light surface 22 of the light guide plate 21. Thereby, it is possible to achieve a further increase in the brightness of the illumination light.

Further, in the spread illuminating apparatus 10, a portion of the mounting surface 31a of the FPC 31 arranged in the forward portion 52 of the second region 55 exists in the white cover lay film 32c, and the forward portion 52 has a shape that spreads out like a fan toward the forward direction. Therefore, part of the light emitted from the LED 11 that progresses forward with a fixed spread angle can be efficiently reflected, and thus it is possible to achieve a further increase in the brightness of the illumination light.

Here, in the spread illuminating apparatus according to the present invention, the light-reflecting member arranged on the circuit board does not necessarily have to be constituted by the white cover lay film 32c as long as it includes a portion arranged in the first region 51 of the mounting surface 31a, and it can be constituted by any appropriate means.

However, constituting the light-reflecting member by the white cover lay film 32c as in the spread illuminating apparatus 10 has the following advantages compared to, for example, a case in which the light-reflecting member is arranged by forming an FPC having a normal (with no white reflective layer) cover lay film and then performing white color printing on the surface of the cover lay film.

In a case in which openings for exposing the electrode pads are formed in a normal cover lay film, the cover lay film is layered and adhered onto a mounting surface of a base film, and then white color printing is performed on the surface of the cover lay film, the printing range is generally set by taking a blank space of a fixed dimension (normally, about 0.4 mm) from a range that includes the entirety of the pair of openings (and the range for mounting the LED), in consideration of the positioning precision of printing. Therefore, in this method, it is actually difficult to perform white color printing in the first region 51 that extends forward from a position corresponding to the center of the light-emitting surface 12 of the LED 11. The same can be said about the second region 55 including the portion 53 that extends rearward from a position corresponding to the center of the light-emitting surface 12 of the LED 11.

In contrast, the FPC 31 of the spread illuminating apparatus 10 is constituted by forming the necessary openings 41 in the white cover lay film 32c that is provided in advance with a white reflective layer across its entire surface, and then adhering the white cover lay film 32c to the mounting surface 31a. Therefore, the light-reflecting member arranged in the first region 51 and the second region 55 of the mounting surface 31a is incorporated into the FPC 31 simultaneously with the adherence of the white cover lay film 32c.

Further, in the FPC 31, the positioning in the left-right direction when mounting the LED 11 to the mounting surface 31a is carried out based on the opposing sides (the sides the define the width e of the band-shaped part) of the pair of openings 41 of the white cover lay film 32c. Therefore, as a result, the band-shaped part is always arranged with high precision at a position corresponding to the center in the left-right direction of the light-emitting surface 12 of the LED 11 regardless of the positioning precision when the white cover lay film 32c is adhered to the mounting surface 31a.

This means that in the FPC 31, the light-reflecting member made of the white cover lay film 32c is always arranged with high precision along the left-right direction in the first region 51 that extends forward from a position corresponding to the center in the left-right direction of the light-emitting surface 12 of the LED 11 and the second region 55 including the portion 53 that extends rearward from a position corresponding to the center in the left-right direction of the light-emitting surface 12 of the LED 11.

In addition, in the FPC 31, the portion of the white cover lay film 32c arranged in the first region 51 and the portion of the white cover lay film 32c placed in the rearward portion 53 of the second region 55 are formed to be continuous in the above-described band-shaped part. Therefore, when mounting the LED 11 on the mounting surface 31a, even if the positioning in the front-back direction is displaced, portions that are arranged in the first region 51 that extends forward from a position of the light-emitting surface 12 that is displaced in the front-back direction and the rearward portion 53 of the second region 55 will definitely exist in the white cover lay film 32c.

This means that in the FPC 31, even in the case that the mounting position of the LED 11 is displaced in the front-back direction, the light-reflecting member made of the white cover lay film 32c is always arranged with high precision along the front-back direction in the first region 51 that extends forward from a position corresponding to the center in the left-right direction of the light-emitting surface 12 of the LED 11 and the rearward portion 53 of the second region 55 that extends rearward from a position corresponding to the center in the left-right direction of the light-emitting surface 12 of the LED 11.

Thus, in the spread illuminating apparatus 10, by constituting the light-reflecting member arranged in the FPC 31 by the white cover lay film 32c, the light-reflecting member arranged in the first region 51 and the second region 55 of the mounting surface 31a can be easily formed. Further, by constituting the light-reflecting member arranged in the FPC 31 by the white cover lay film 32c, the light-reflecting member can be arranged with high precision in the first region 51 and the second region 55. Thereby, the brightness of the illumination light can be stabilized at a high level without any irregularities in each apparatus.

Next, in the spread illuminating apparatus 10, the operational effects of the inclined part 27 and the pedestal 29 having the first and second surfaces 29a and 29b provided to the light guide plate 21 will be explained.

In the spread illuminating apparatus 10, the receiving surface of the pedestal 29 on which the FPC 31 is installed includes a first surface 29a that is formed on the incident light surface 22 side of the light guide plate 21 and a second surface 29b that is formed in front of the first surface 29a and is inclined toward the inclined part 27 side from the first surface 29a side in the forward direction. Due to this structure, in the spread illuminating apparatus 10, the interval between the emitting surface 25 at the portion in front of the LED 11 and the front end side of the FPC 31 fixed to the receiving surface 29a, 29b of the pedestal 29 becomes narrow. Therefore, even if some light leaks out from the inclined surface 27a of the inclined part 27, the leaked light can be effectively inhibited from progressing to the emitting surface 25 side by reflection by the white cover lay film 32c arranged in the portion of the FPC 31 covering the inclined surface 27a, and thus the uniformity of the brightness of the illumination light can be improved.

FIG. 1 (and FIG. 2) illustrate an example in which an opening having a small height d from the emitting surface 25 exists at the front end side of the pedestal 29 (boundary portion between the second surface 29b and the emitting surface 25). The height d is smaller than at least the height from the emitting surface 25 to the first surface 29a of the pedestal 29 (corresponding to the height D shown in FIG. 5). However, in the spread illuminating apparatus 10, the pedestal 29 can be formed so that the height d is zero, and thereby the uniformity of the brightness of the illumination light can be improved.

In the spread illuminating apparatus 10, the light-reflecting member made of the white cover lay film 32c is arranged at a portion of the FPC 31 that covers the inclined surface 27a and a portion of the emitting surface 25 near the inclined surface 27a. Therefore, at least part of the light that has been reflected by the white cover lay film 32c among the light leaked from the inclined surface 27a reenters the light guide plate 21 so that it can be utilized as illumination light. Accordingly, in the spread illuminating apparatus 10, the structure in which the second surface 29b is provided to the receiving surface of the pedestal 29 on which the FPC 31 is installed also contributes to increasing the brightness of the illumination light.

However, as explained above, in the circuit board according to the present invention, the light-reflecting member must be arranged in at least the first region 51, and in a preferred embodiment, the light-reflecting member is arranged in the first region 51 and the rearward portion 53 of the second region 55, and in a further preferred embodiment, the light-reflecting member is arranged in the first region 51 as well as the forward portion 52 and the rearward portion 53 of the second region 55. Therefore, the circuit board according to the present invention can be constituted such that the light-reflecting member is not arranged in a part or all of the portion of the FPC31 that covers the inclined surface 27a and a portion of the emitting surface 25 near the inclined surface 27a.

In this case, for example, the white cover lay film 32c of the FPC 31 can be constituted to include a white reflective layer in only a portion (portion in which the LED 11 is mounted) 34 (refer to FIG. 4A) positioned rearward of a position corresponding to the incident light surface 22 when arranged on the light guide plate 21, and constituted as a normal cover lay film without a white reflective layer in a portion (portion including a portion arranged on the top surface 26a of the flat part 26 and the first and second surfaces 29a and 29b of the pedestal 29) 33 (refer to FIG. 4A) positioned in front of the position corresponding to the incident light surface 22.

In the above structure, the progression of leaked light from the inclined surface 27a of the inclined part 27 to the emitting surface 25 is primarily inhibited by absorption by the portion of the FPC 31 covering the inclined surface 27a, and thereby the uniformity of the brightness of the illumination light is improved.

Further, in order more effectively absorb light that has leaked from the inclined surface 27a of the inclined part 27 by the portion of the FPC 31 that covers the inclined surface 27a, a light-absorbing member (for example, a black paint) can be arranged in at least part of or preferably all of the portion 33 positioned in front of the cover lay film 32c.

In the case that a light-absorbing member is applied to the portion 33 positioned in front of the cover lay film 32c, the cover lay film 32c can be constituted to also include a white reflective layer in the portion 33 positioned in front such that the light-absorbing member is layered over the white reflective layer. Further, the light-absorbing member is not limited to black paint, and for example, a diffusive film can be arranged as the light-absorbing member.

In the spread illuminating apparatus 10 including the inclined part 27 and the pedestal 29 having the first surface 29a and the second surface 29b, the FPC on which the LED 11 is mounted can be constituted such that the entire cover lay film is made of a normal cover lay film without a white reflective layer. In this case, the progression of leaked light from the inclined surface 27a of the inclined part 27 to the emitting surface 25 is primarily inhibited by absorption by the portion of the FPC covering the inclined surface 27a, and thereby the uniformity of the brightness of the illumination light is improved.

In such a cover lay film, similar to the above-described structure of the FPC 31, the light-absorbing member (for example, a black paint) can be arranged in at least part of or preferably all of the portion corresponding to the portion 33 positioned in front, and the light-absorbing member is not limited to black paint, and for example, a diffusive film can be arranged as the light-absorbing member.

Alternatively, such a cover film can be constituted such that a light-reflecting member (for example, a white paint) is arranged in at least part of or preferably all of the portion corresponding to the portion 33 positioned in front. In this case, operational effects similar to those of the FPC 31 including the white reflective layer in the portion 33 positioned in front are achieved with respect to light that has leaked from the inclined surface 27a of the inclined part 27.

In addition, in the spread illuminating apparatus 10, the first surface 29a of the pedestal 29 is formed together with the top surface 26a of the flat part 26 and the top surface 30a of the pawl 30 to be approximately perpendicular relative to the incident light surface 22 of the light guide plate 21. Thereby, in a state that the FPC 31 is fixed onto the light guide plate 21, the light-emitting surface 12 of the LED 11 faces approximately in parallel the incident light surface 22 of the light guide plate 21. Thus, the spread illuminating apparatus 10 can maintain the operational effect in which the light which has been emitted from the light-emitting surface 12 of the LED 11 can be efficiently introduced into the light guide plate 21 without any light leakage and thus an increase in the brightness of the illumination light can be achieved at a level equivalent to that of the conventional spread illuminating apparatus 100, and achieve a further improvement in the uniformity of the brightness as described above.

In addition, in the spread illuminating apparatus 10, similar to the conventional spread illuminating apparatus 100, in a state that the FPC 31 is fixed onto the light guide plate 21, a gap is formed between the inclined surface 27a at the portion in front of the LED 11 and the surface of the cover lay film 32c of the FPC 31. Therefore, an effect is obtained in which light which enters into the light guide plate 21 and is reflected on the inclined surface 27a is prevented from being absorbed by the FPC 31, thereby achieving an increase in the brightness of the illumination light. This effect is particularly advantageous with regard to achieving an increase in the brightness of the illumination light in the case that the white cover lay film 32c of the FPC 31 is constituted so that it does not include a white reflective layer in the portion 33 positioned in front of the position corresponding to the incident light surface 22.

Since the flat part 26 is formed but the first surface 29a is not formed in the portion in front of the light source, the inclined part 27 can be formed toward the incident light surface 22. Thereby, the inclined part 27 can be arranged away from an effective emitting region of the emitting surface 25, and it is possible to reduce any negative effects on the uniformity of the brightness of the illumination light from light that leaks out from the inclined surface 27a of the inclined part 27.

In the spread illuminating apparatus 10, the receiving surface of the pedestal 29 includes a first surface 29a that is formed on the incident light surface 22 side of the light guide plate 21 and a second surface 29b that is formed in front of the first surface 29a and is inclined toward the inclined part 27 side from the first surface 29a side in the forward direction. Thereby, the FPC 31 is bent following the inclination of the second surface 29b relative to the first surface 29a at a bending position f corresponding to the boundary of the first surface 29a and the second surface 29b and fixed to the first and second surfaces 29a and 29b of the pedestal 29.

Therefore, in order to decrease the reactive force of bending and improve the long-term stability of the fixation of the FPC 31 to the light guide plate 21, the pedestal 29 is preferably constituted such that the second surface 29b inclines gently relative to the first surface 29a (or in other words, the inclination angle of the second surface 29b relative to the emitting surface 25 is reduced).

Thereby, the reactive force of bending at the bending position f of the FPC 31 is decreased, and the surface area for adhering the FPC 31 is increased because the surface area of the second surface 29a can be made larger. Thus, the long-term stability of the fixation of the FPC 31 to the light guide plate 21 is improved. From this perspective, in the spread illuminating apparatus 10, the structure in which the inclination angle (relative to the emitting surface 25) of the second surface 29b of the pedestal 29 is smaller than the inclination angle of the inclined surface 27a of the inclined part 27 is advantageous compared to a case in which the inclination angle (relative to the emitting surface 25) of the second surface 29b of the pedestal 29 is set equal to or greater than the inclination angle of the inclined surface 27a of the inclined part 27.

However, in the spread illuminating apparatus 10, if necessary, the inclination angle of the second surface 29b of the pedestal 29 can be set equal to or greater than the inclination angle of the inclined surface 27a of the inclined part 27 in consideration of the characteristics of the FPC 31, the specifications of the emitting surface 25, and/or the appropriate length of the first surface 29a and the like.

In the spread illuminating apparatus 10 constituted as described above, the structure in which the pedestal 29 includes the first surface 29a and the second surface 29b as described above is also advantageous in that a further improvement in the uniformity of the brightness can be achieved while maintaining the narrowing of the frame of the spread illuminating apparatus without narrowing the effective emitting region of the emitting surface 25 as a result of displacement in the forward direction of the formation position of the inclined part 27, compared to a structure in which, for example, such a pedestal 29 is not provided and the flat part 26 in front of the LED 11 is extended toward the forward direction and the FPC 31 is fixed onto the top surface 26a of the extended flat part 26 and the inclined surface 27a of the inclined part 27.

In the spread illuminating apparatus 10, the existence of the flat part 26 is not essential in the optical functioning, and the flat part 26 does not necessarily have to be provided. However, in order to increase the surface area for adhering the FPC 31 to the light guide plate 21 and stabilize the positioning and fixing of the light guide plate 21 and the LED 11, it is preferable to provide the flat part 26. Thereby, the uniformity of the brightness of the illumination light can be stably maintained over a longer period of time.

Figure 4B:
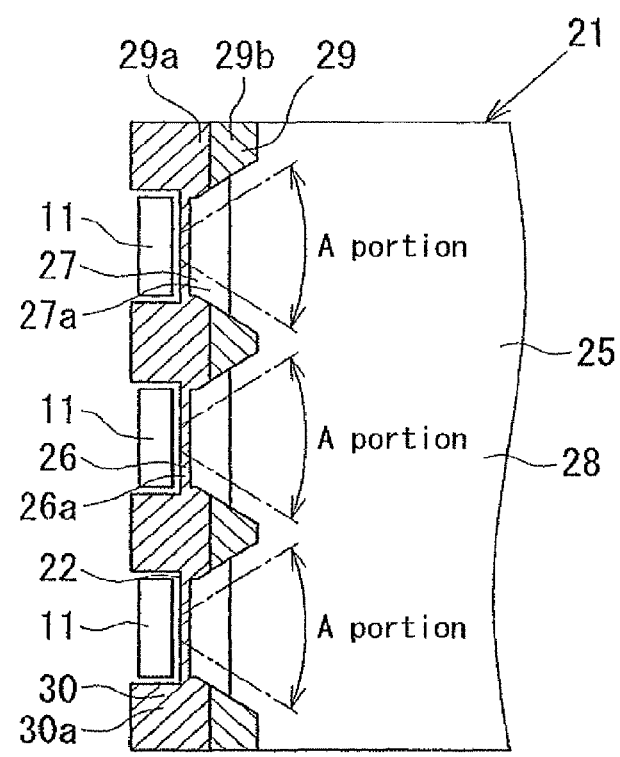
FIG. 4B is a plan view of the essential parts of the light guide plate, which is a constituent component of the spread illuminating apparatus shown in FIG. 1.

Furthermore, as indicated by the A parts in FIG. 4B, the light emitted from the light-emitting surface 12 of the LED 11 spreads out like a fan as it progresses within the light guide plate 21 toward the forward direction. Therefore, in the spread illuminating apparatus 10, the structure in which the pedestal 29 is formed so that the width narrows toward the forward end side along the forward direction when viewed from the top surface is advantageous in that the interval between adjacent pedestals 29 widens toward the forward direction, the progression of light guided within the inclined part 27 is not blocked, the surface areas of the first and second surfaces 29a and 29b of the pedestal 29 can be made as large as possible, and the adhesive strength between the FPC 31 and the light guide plate 21 can be improved.

Preferred embodiments of the present invention were explained above, but the present invention is not limited to the above-described embodiments, and various modifications and combinations are possible as long as they do not deviate from the gist of the present invention.

For example, in the above-described embodiments, the pedestal 29 is formed to have a length such that the end of the pedestal 29 reaches a portion of the emitting surface 25 near the inclined surface 27a. However, in the spread illuminating apparatus according to the present invention, the front end of the pedestal 29 does not necessarily have to reach the emitting surface 25, and the length of the pedestal 29 can be the same as or shorter than the length of the inclined surface 27a in consideration of design conditions described above such as the length of the first surface 29a, the inclination angle of the second surface 29b, and the height d at the front end side.

In the above-described embodiments, the slope of the inclined surface 27a of the inclined part 27 is illustrated as fixed. However, the slope of the inclined surface 27a of the inclined part 27 can change continuously along the forward direction in the light-guide direction. In the spread illuminating apparatus according to the present invention, the existence of the pawl 30 is not essential in the optical functioning similar to the flat part 26, and the pawl 30 does not have to be provided.

Furthermore, in the above-described embodiments, a structure was explained in which the FPC 31 in which the light-reflecting member is arranged in the first region 51 was applied to the light guide plate 21 including the inclined part 27 that tapers in thickness from the incident light surface 22 side toward the forward direction and the pedestal 29 having the first surface 29a and the second surface 29b in which the FPC 31 is fixed. However the spread illuminating apparatus according to the present invention can include a light guide plate (which typically has a uniform thickness across its entirety) in which an inclined part is not provided on the incident light surface side, and a circuit board (for example, the FPC 31) in which the light-reflecting member is arranged in the first region 51 can be fixed on the emitting surface side or the reflective surface side near the incident surface side of such a light guide plate. Here, needless to say, even if the inclined part is provided on the incident surface side of the light guide plate, the circuit board may be fixedly arranged on the reflective surface side (that is, the surface on which the inclined surface is not provided) near the incident surface side.

Figure 5:
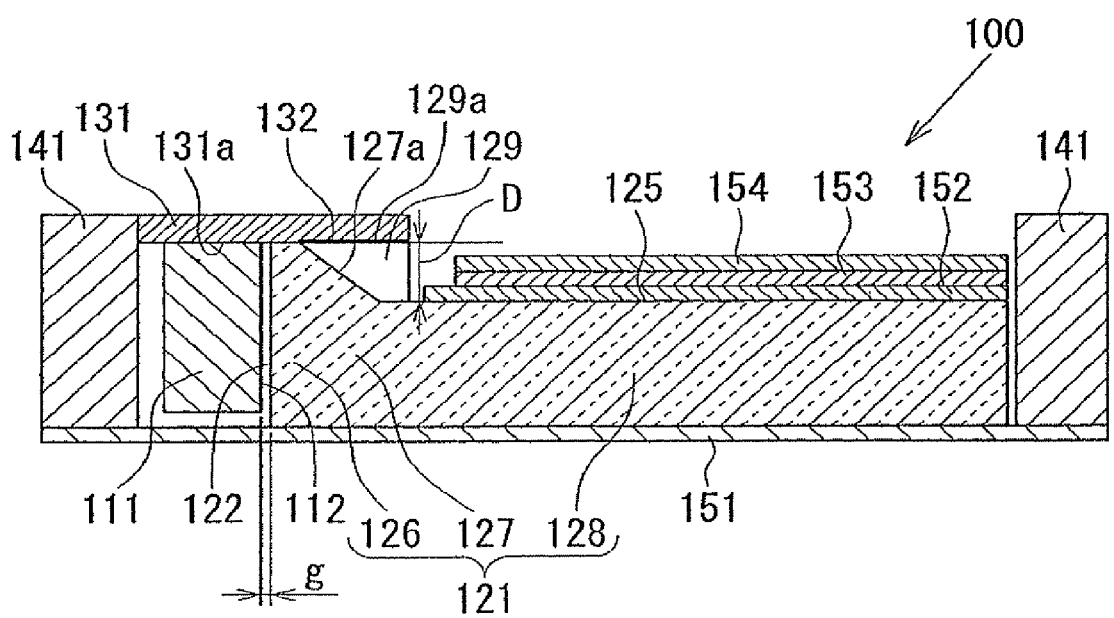
FIG. 5 is a cross-section view illustrating one example of a conventional spread illuminating apparatus.

Alternatively, as in the spread illuminating apparatus 100 shown in FIG. 5, the spread illuminating apparatus according to the present invention can include the light guide plate 121 including the inclined part 127 that tapers in thickness from the incident light surface 122 side toward the forward direction and the pedestal 129 having only the top surface 129a that is approximately perpendicular to the incident light surface 122, and the circuit board (for example, the FPC 31) in which the light-reflecting member is arranged in the first region 51 can be fixed to the top surface 129a of the pedestal (and if they exist, the top surface 126a of the flat part 126 and the top surface 130a of the pawl 130).

What is claimed is:

1. A spread illuminating apparatus comprising:
   a point light source having a light-emitting surface that emits light toward a forward direction,
   a circuit board on which the point light source is mounted, and
   a light guide plate having an incident light surface on which the point light source is arranged and an emitting surface that emits light that has introduced from the incident light surface, the light being adapted to advance in a widely spread manner,
   wherein the light guide plate has an inclined part that tapers in thickness from the incident light surface side toward the forward direction, a pedestal having a receiving surface on which the circuit board is arranged is formed in a region excluding a portion in front of the point light source on an inclined surface side of the inclined part, and the receiving surface of the pedestal is configured to extend from the incident light surface side toward the forward direction so as to incline toward a side of the inclined part, and wherein an inclined angle defined by the receiving surface of the pedestal is set to be less than an inclined angle of the inclined surface of the inclined part.

2. The spread illuminating apparatus according to claim 1, wherein the light guide plate includes a flat part having a thickness that is approximately constant between the incident light surface and the inclined part.

* * * * *